United States Patent
Lee et al.

(10) Patent No.: US 11,321,820 B2
(45) Date of Patent: May 3, 2022

(54) VIDEO DATA QUALITY IMPROVING METHOD AND APPARATUS

(71) Applicant: LG ELECTRONICS INC., Seoul (KR)

(72) Inventors: Woon Chae Lee, Seoul (KR); Won Su Choi, Gwangmyeong-si (KR); Seon Hui Sunny Kim, Seoul (KR); Min Ho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 16/742,277

(22) Filed: Jan. 14, 2020

(65) Prior Publication Data

US 2021/0133943 A1 May 6, 2021

(30) Foreign Application Priority Data

Oct. 31, 2019 (KR) ........................ 10-2019-0138066

(51) Int. Cl.
*G06T 5/50* (2006.01)
*G06T 5/00* (2006.01)
(Continued)

(52) U.S. Cl.
CPC ............ *G06T 5/50* (2013.01); *G06K 9/00765* (2013.01); *G06K 9/628* (2013.01); *G06T 5/001* (2013.01);
(Continued)

(58) Field of Classification Search
CPC ......... G06T 5/50; G06T 5/001; G06T 7/0002; G06T 2207/30168; G06T 2207/10016;
(Continued)

(56) References Cited

U.S. PATENT DOCUMENTS

2003/0185457 A1* 10/2003 Campbell ............ H04N 1/4074
382/254
2014/0099034 A1* 4/2014 Rafati ................ G06K 9/00275
382/209
(Continued)

FOREIGN PATENT DOCUMENTS

KR 10-1963308 B1 3/2019

OTHER PUBLICATIONS

Hu, et. al., Proc. IEEE 8th Int. Cong. on Image and Signal Processing (CISP), 2015, pp. 119-124 (Year: 2015).*
(Continued)

*Primary Examiner* — Michael J Vanchy, Jr.
(74) *Attorney, Agent, or Firm* — Birch, Stewart, Kolasch & Birch, LLP

(57) ABSTRACT

A method for improving image illumination of the present disclosure includes receiving images of original video data, classifying and arranging the images according to illumination for image enhancement processing of the original video data images, and generating high illumination images for an image region by processing the images using a neural network for image enhancement that is selected according to the illumination attribute of the classified images from among groups of neural networks for image enhancement, so as to reproduce a video having enhanced illumination. The neural network for image enhancement according to an embodiment of the present disclosure may be a deep neural network generated through machine learning, and input and output of images is performed in an Internet of Things (IoT) environment using a 5G network.

18 Claims, 8 Drawing Sheets

(51) Int. Cl.
*G06T 7/00* (2017.01)
*G06K 9/00* (2022.01)
*G06K 9/62* (2022.01)

(52) U.S. Cl.
CPC .. *G06T 7/0002* (2013.01); *G06T 2207/10016* (2013.01); *G06T 2207/20084* (2013.01); *G06T 2207/30168* (2013.01)

(58) Field of Classification Search
CPC . G06T 2207/20084; G06T 2207/20081; G06T 5/007; G06K 9/628; G06K 9/00765; G06K 9/00744; G06K 9/4628; G06K 9/4661
See application file for complete search history.

(56) References Cited

U.S. PATENT DOCUMENTS

2016/0132724 A1* 5/2016 Yamamoto ........... H04N 1/3871
                                                        348/135
2018/0300855 A1  10/2018 Tang et al.
2019/0043178 A1*  2/2019 Chen ....................... G06T 5/009
2019/0228273 A1*  7/2019 Merrill .................... G06N 3/08

OTHER PUBLICATIONS

Wang, et. al., 2017 Int. Conf. on Progress in Informatics and Computing (PIC), 2017, pp. 108-112 (Year: 2017).*

* cited by examiner

VIDEO DATA QUALITY IMPROVING METHOD AND APPARATUS

CROSS-REFERENCE TO RELATED APPLICATION

This present application claims the benefit of priority to Korean Patent Application No. 10-2019-0138066, entitled "VIDEO DATA QUALITY IMPROVING METHOD AND APPARATUS" filed on Oct. 31, 2019, in the Korean Intellectual Property Office, the entire disclosure of which is incorporated herein by reference.

BACKGROUND

1. Technical Field

The present disclosure relates to a method and apparatus for improving video quality, capable of outputting a video composed of images having enhanced illumination by classifying the images according to illumination and using a neural network for image enhancement suitable for the relevant attributes of the classified images.

2. Description of Related Art

The following description is only for the purpose of providing background information related to embodiments of the present disclosure, and the contents to be described do not necessarily constitute related art.

Image processing technology is a technology relating to a method for performing specific operations on an image so as to improve the quality of an image, or extract specific information from an image.

Image processing technology is a technology that can be widely used in various fields, and is one of the core technologies essentially required in diverse fields such as autonomous vehicles, security monitoring systems, image communication, and high-definition video transmission.

With the development of image sensors, 5G communication networks, and artificial intelligence technology, image processing technology is also developing. Recently, a method of converting a low illumination image into a high illumination image using a deep neural network has been attempted.

US Patent Application Publication No. 2018-0300855 relates to a method and system for processing an image, and relates to a technology configured such that high illumination original images are randomly cropped and are set as ground truth images to generate a training image to train a neural network, low illumination images are generated through down-sampling after blurring each of the ground truth images, and the ground truth images are paired with the low illumination images.

The above-mentioned disclosure relates to a method for automatically generating training data for training a neural network for improving image illumination, but does not move the discussion forward in regards to a method for effectively utilizing the generated neural network.

Korean Patent Registration No. 10-1963308 relates to a system for monitoring a moving object and a sudden situation in an image using deep learning, configured to extract and reconstruct an image of a region of interest from a reference image acquired with low illumination, and extract a moving object from the reconstructed image and perform deep learning based thereon. Thereafter, the recognition rate of the moving object can be increased by inferring the moving object from the captured image acquired in real time.

The above-mentioned disclosure relates to a method of extracting a moving object from a low illumination image through deep learning, but utilizes a deep neural network model trained using one method. Hence, there is a limit in enhancing the illumination of an object or another image that is not a moving object.

In order to overcome the above-mentioned limits, there is a need for a solution capable of effectively generating high illumination images by utilizing neural network models trained using various methods in the most suitable method for diverse kinds of images.

The background art described above is technical information retained by the present inventors in order to derive the present disclosure or acquired by the present inventors in the process of deriving the present disclosure, and thus is not necessarily known art disclosed to the general public before the filing of the present application.

SUMMARY OF THE INVENTION

The present disclosure is directed to addressing an issue associated with some related art in which image processing is not efficient because only one designated neural network is used to perform illumination improvement processing for an image.

Specifically, the present disclosure is directed to classifying an image according to illumination, and selecting a neural network for image enhancement suitable for the classified image to perform image enhancement, so as to perform image processing efficiently.

In addition, the present disclosure is directed to enhancing the illumination of a real-time video, thereby enabling the video to be reproduced in real time with improved illumination.

Specifically, the present disclosure is directed to reducing the time required for overall image illumination processing by allowing selective illumination enhancement of only low illumination video image frames in a real-time video.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

A method for improving video quality according to an embodiment of the present disclosure may include the processes of receiving original video data including a plurality of frames, classifying the frames into at least a first image group and a second image group according to illumination for image enhancement processing of the original video data, selecting a first neural network according to the illumination attribute of the first image group and selecting a second neural network according to the illumination attribute of the second image group, among groups of neural networks for image enhancement, and generating enhanced video data by processing the frames of the first image group using the first neural network and processing the frames of the second image group using the second neural network.

Specifically, the images constituting the received original video data are classified according to illumination and are arranged according to illumination, the illumination of low illumination and ultra-low illumination images is enhanced using a neural network for image enhancement, and the enhanced images are then rearranged to be in the same arrangement as the original video data, so as to output a video having enhanced illumination.

In addition, an apparatus for improving video quality according to another embodiment of the present disclosure may include a processor and a memory connected to the processor.

Specifically, the memory may store commands which, when executed by the processor, cause the processor to receive images of original video data including a plurality of frames, classify the images according to illumination for image enhancement processing of the images of the original video data, and generate an enhanced image by processing a selected image using a neural network for image enhancement selected from groups of neural networks for image enhancement according to the illumination attribute of the image.

Other embodiments, aspects, and features than those described above will become apparent from the following drawings, claims, and detailed description of the present disclosure.

An apparatus and method for improving video quality according to embodiments of the present disclosure is configured to select and use a neural network for image enhancement that is suitable according to the illumination attribute of an image of original video data. Accordingly, an optimal high illumination image can be acquired for each image.

In addition, according to the embodiments of the present disclosure, by classifying images of original video data according to illumination, enhancing the illumination of the classified images, and rearranging the images of which the illumination has been enhanced to be the same as the original video data, a viewer is enabled to view a video with improved illumination.

In addition, according to the embodiments of the present disclosure, images of original video data are classified according to illumination, the illumination of the classified images is enhanced, and the images of which the illumination has been enhanced are rearranged to be the same as the original video data. Here, in the rearranged images, when images having an illumination difference greater than or equal to a previously stored illumination difference are arranged consecutively, an average value of consecutive image frame filter values may be applied so as to reduce the illumination difference between the consecutive images recognized by a viewer.

In addition, according to the embodiments of the present disclosure, in order to enhance the illumination of a video reproduced in real time, only low illumination images are selected for illumination enhancement and reproduced, among the frames of the video. Accordingly, inconvenience of the user related to playback of a video can be prevented.

In addition, according to the embodiments of the present disclosure, in order to enhance the illumination of a video reproduced in real time, images for illumination enhancement are selected among the frames of the video at regular time intervals, and enhanced. Thereafter, the images for illumination enhancement that were not selected can be replaced with the images of which the illumination has been enhanced, thereby improving the overall image processing speed.

The effects of the present disclosure are not limited to those mentioned above, and other effects not mentioned can be clearly understood by those skilled in the art from the following description.

DETAILED DESCRIPTION

Figure 1:
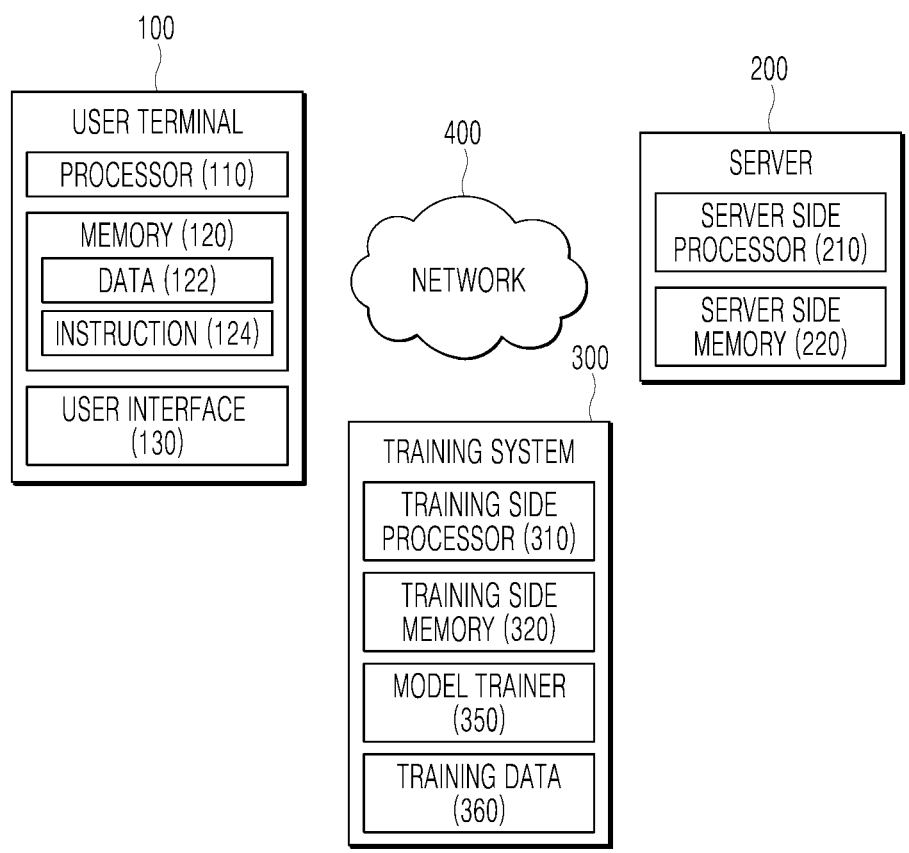
FIG. 1 is an illustration of an environment for performing a video quality improvement method according to an embodiment of the present disclosure.

Hereinafter, the embodiments disclosed in this specification will be described in detail with reference to the accompanying drawings. The present disclosure may be embodied in various different forms and is not limited to the embodiments set forth herein. Hereinafter, in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, a video quality improvement method and apparatus capable of displaying a video having enhanced illumination by improving the illumination of images constituting the video of an embodiment of the present disclosure will be described in detail with reference to the accompanying drawings.

Figure 2:
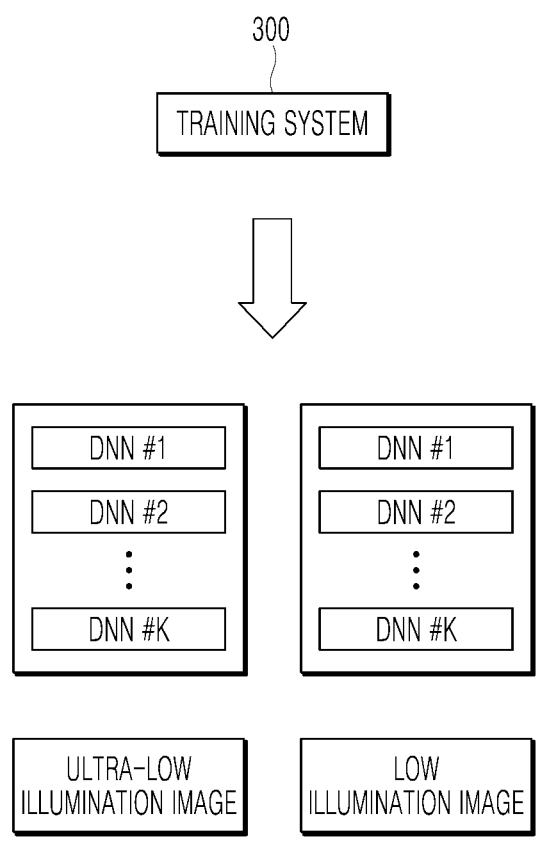
FIG. 2 shows a system for generating a neural network for image enhancement according to an embodiment of the present disclosure.

FIG. 1 is an illustration of an environment for performing a video quality improvement method according to an embodiment of the present disclosure. FIG. 2 shows a system for generating a neural network for image enhancement according to an embodiment of the present disclosure.

An environment for performing a video quality improvement method according to an embodiment of the present disclosure may include a user terminal 100, a server 200, a training system 300, and a network 400 that enables these components to communicate with one another.

The user terminal 100 may support object-to-object intelligent communication (such as Internet of things (IoT), Internet of everything (IoE), and Internet of small things (IoST)), and may support communication such as machine to machine (M2M) communication and device to device (D2D) communication.

The user terminal 100 may determine an image illumination improvement method using big data, artificial intelligence (AI) algorithms, and/or machine learning algorithms in a 5G environment connected for the IoT.

The user terminal 100 may be a computing device of any kind, such as a personal computer, a smartphone, a tablet, a game console, and a wearable device. The user terminal 100 may include one or more processors 110 and a memory 120.

The one or more processors 110 may include any type of apparatus capable of processing data, such as an MCU. Here, the "processor" may refer to, for example, a data processing apparatus embedded in hardware and having physically structured circuits in order to perform functions represented as a code or command included in a program.

Examples of the data processing apparatus embedded in hardware may include a microprocessor, a central processing unit (CPU), a processor core, a multiprocessor, an application specific integrated circuit (ASIC), and a field programmable gate array (FPGA), but are not limited thereto.

The memory 120 may include one or more non-transitory storage media, such as RAM, ROM, EEPROM, EPROM, flash memory devices, and magnetic disks. The memory 120 may store a plurality of instructions 124 that cause the user terminal 100 to perform operations when executed by data 122 and the one or more processors 110.

In addition, the user terminal 100 includes a user interface 130, and thus may receive commands from a user and may deliver output information to a user. The user interface 130 may include various input means such as a keyboard, a mouse, a touch screen, a microphone, and a camera, and various output means such as a monitor, a speaker, and a display.

A user may select a video to be processed in the user terminal 100 through the user interface 130. For example, a user may select a video that a user wishes to view through a mouse, a keyboard, and a touch screen. The selected video refers to a video in which general illumination images, low illumination images, and ultra-low illumination images are each located in respective frames that constitute the video.

In an embodiment, the user terminal 100 may store or include various learning models to which artificial intelligence technology capable of enhancing low illumination images and ultra-low illumination images among the images of the videos is applied, such as deep neural networks, other types of machine learning models, or technology including the learning models.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

The SVM may include a supervised learning model for pattern detection and data analysis, heavily used in classification and regression analysis.

The ANN is a data processing system modeled after the mechanism of biological neurons and interneuron connections, in which a number of neurons, referred to as nodes or processing elements, are interconnected in layers.

The ANNs are models used in machine learning and may include statistical learning algorithms conceived from biological neural networks (particularly of the brain in the central nervous system of an animal) in machine learning and cognitive science.

Specifically, the ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

The ANN may be defined by the following three factors: (1) a connection pattern between neurons on different layers; (2) a learning process that updates synaptic weights; and (3) an activation function generating an output value from a weighted sum of inputs received from a previous layer.

The ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

The ANN may be classified as a single-layer neural network or a multi-layer neural network, based on the number of layers therein.

In general, a single-layer neural network may include an input layer and an output layer.

In general, the multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

The ANN may be trained using training data. Here, the training may refer to the process of determining parameters of the artificial neural network by using the training data, to perform tasks such as classification, regression analysis, and clustering of inputted data. Representative examples of parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

The unsupervised learning is a machine learning method that learns from training data that has not been given a label.

More specifically, the unsupervised learning may be a learning method that learns an artificial neural network to discover a pattern within given training data and perform classification by using the discovered pattern, rather than by using a correlation between given training data and labels corresponding to the given training data.

Examples of the unsupervised learning may include clustering and independent component analysis.

Examples of the artificial neural network using the unsupervised learning may include a generative adversarial network (GAN) and an autoencoder (AE).

The GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve so as to fool the discriminator as effectively as possible, while the discriminator may evolve so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this case, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

The semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

The reinforcement learning may be performed primarily by a Markov decision process (MDP).

The Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

The hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

The loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

The loss functions typically use means squared error (MSE) or cross entropy error (CEE), but the present disclosure is not limited thereto.

A cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

The GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

The GD obtains a slope of the cost function through use of partial differential equations, using each of model parameters, and updates the model parameters by adjusting the model parameters by a learning rate in the direction of the slope.

The SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In the SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, an artificial neural network is first trained by experimentally setting the hyperparameters to various values, and based on the results of training, the hyperparameters can be set to optimal values that provide a stable learning rate and accuracy.

The learning model to which the artificial intelligence technology as described above is applied may be first generated through training by the training system 300, stored in the server 200, and transmitted to the user terminal 100 through the network 400.

The learning model is a neural network for image enhancement, and may be trained to process an inputted low illumination image in order to output a high illumination image.

Typically, the learning model is stored in the user terminal 100 in a state in which, having completed the training in the training system 300, the learning model can be applied to a low illumination image, but in some embodiments, the learning model may additionally be updated or upgraded through training in the user terminal 100.

Alternatively, the learning model stored in the user terminal 100 may be a part of the learning model generated in the training system 300. If necessary, a new learning model may be generated in the training system 300, and delivered to the user terminal 100.

As another example, the learning model may be stored in the server 200 instead of being stored in the user terminal 100, and may provide a function necessary for the user terminal 100 in the form of a web service.

The server 200 includes a server side processor 210 and a server side memory 220, and may generally have greater processing capacity and greater memory capacity than the user terminal 100. Accordingly, according to the system implementation, heavy learning models that require more processing power for application may be stored in the server 200, and lightweight learning models that require less processing power for application may be stored in the user terminal 100.

The user terminal 100 may select a suitable learning model according to an attribute of an image to be processed, among many learning models. In one example, the user terminal 100 may be configured such that the user terminal 100 uses a learning model stored in the user terminal 100 when a lightweight learning model is required, and uses a learning model stored in the server 200 when a heavy learning model is required.

The training models included in the user terminal 100 or the server 200 may be neural networks for image enhancement generated by the training system 300.

The training system 300 may include one or more training side processors 310 and a training side memory 320. In addition, the training system 300 may include a model trainer 350 and training data 360 for training machine learning models.

The training system 300 may generate a plurality of learning models based on the training data 360 via the model trainer 350.

If the training data 360 is a low illumination image and/or an ultra-low illumination image of a frame of a corresponding video that has been labeled as a high illumination image among the frames of the video, the training system 300 may generate a learning model and a neural network for image enhancement for optimally improving the illumination of the low illumination image and/or the ultra-low illumination image among the frames of the video.

Moreover, the training system 300 may generate a learning model and a neural network for image enhancement to perform training in the same manner also for a general illumination image among the frames of the video.

In the above manner, the training system 300 may generate a learning model group for each type of image. Such a learning model group may include specialized learning models for improving the illumination of images according to various illuminations, such as a learning model for ultra-low illumination images, a learning model for low illumination images, and a learning model for general illumination images according to the illumination.

Here, the higher the illumination, the smaller the number of pixels to be processed and the smaller the capacity of the image. For example, if the same image processing algorithm is applied, a general illumination image is shorter in terms of image processing time of the learning model than an ultra-low illumination image. Accordingly, if the same image processing algorithm is applied, the quality of the enhanced image output of the ultra-low illumination image may be lower than the quality of the enhanced image output of the general illumination image.

Accordingly, in order to acquire the best image from a low illumination image, it may be desirable to apply a neural network for image enhancement having a higher complexity as the illumination is lower. For example, in the case of enhancing an ultra-low illumination image, a neural network for image enhancement having four hidden layers may be used. However, in the case of a general illumination image, a neural network for image enhancement having two hidden layers may be used.

Depending on the initial configuration of a neural network, the training system 300 may generate a neural network for image enhancement with a high complexity that provides better performance but has a longer processing time, and may generate a neural network for image enhancement with a low complexity that provides lesser performance but shortens the processing time.

As such, the learning model group for each type of image is formed to include learning models having various complexities that may be used for images of various illuminations.

Here, the complexity of a neural network for image enhancement is determined by the number of input nodes, the number of features, the number of channels, and the number of hidden layers. It may be understood that the greater the number of features, the greater the number of channels, and the greater the number of hidden layers, the higher the complexity. In addition, a neural network may also be referred to in terms of weight, such that the greater the number of channels and the greater the number of hidden layers, the heavier the neural network. In addition, the complexity of a neural network may be referred to as the dimensionality of a neural network.

The higher the complexity of a neural network, the better the image illumination enhancement performance, but the longer the time required for image processing. Conversely, the lighter the neural network, the relatively lesser the image illumination improvement performance, but the shorter the time required for image processing.

Figure 3:
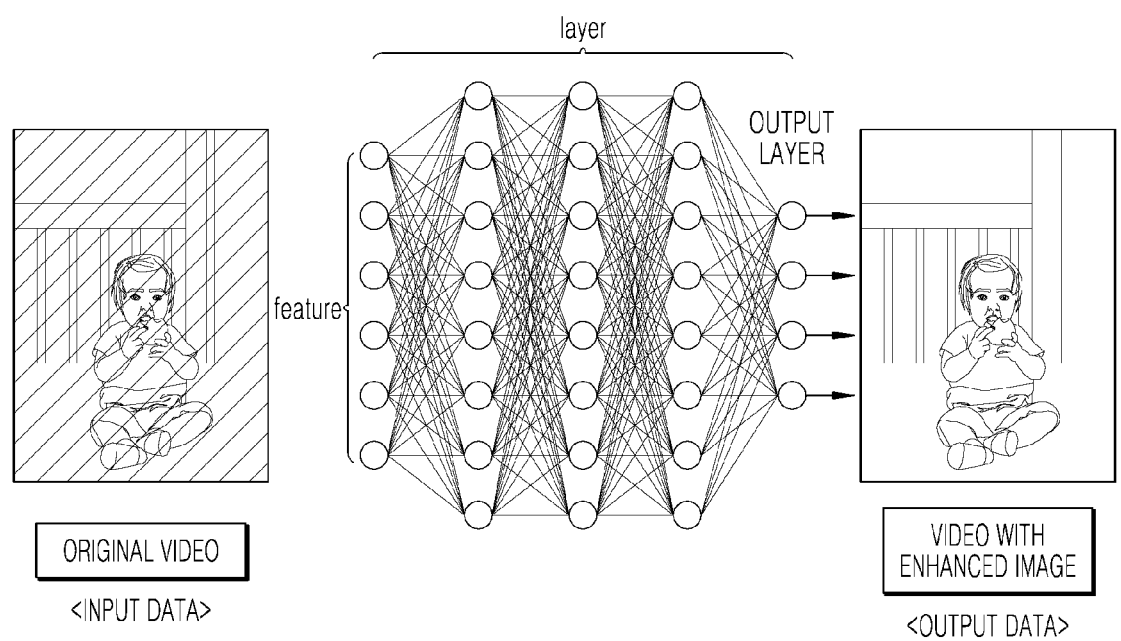
FIG. 3 is a diagram for explaining a neural network for image enhancement according to an embodiment of the present disclosure.

FIG. 3 is a diagram for explaining a neural network for image enhancement according to an embodiment of the present disclosure.

The neural network for image enhancement may be composed of an input layer, a hidden layer, and an output layer. The number of input nodes is determined according to the number of features, and as the number of nodes increases, the complexity or dimensionality of a neural network increases. In addition, as the number of hidden layers increases, the complexity or dimensionality of the neural network increases.

The number of features, the number of input nodes, the number of hidden layers, and the number of nodes in each layer may be determined by the designer of the neural network. As the complexity increases, more processing time is required, but better performance may be achieved.

Once the initial neural network structure has been designed, training data may be used to train the neural network. In order to implement a neural network for enhancing image illumination, a high illumination original image and a low illumination version of the corresponding image are required. By collecting high illumination original images and then blurring the corresponding images and performing down-sampling, low illumination images corresponding to the high illumination original images may be prepared.

When high illumination original images corresponding to the low illumination images are connected via a label, training data for training a neural network to improve image illumination is prepared.

When the neural network is trained using a large amount of training data in a supervised learning method, a neural network model for image enhancement capable of outputting a high illumination image when a low illumination image is inputted may be generated.

Here, when training data including ultra-low illumination images is used as training data, a neural network for image enhancement optimized for improving the illumination of ultra-low illumination images may be acquired. When training data including low illumination images is used, a neural network for image enhancement optimized for improving the illumination of low illumination images may be acquired.

When a neural network is trained with training data including general illumination images in the same manner, a neural network for image enhancement optimized for improving the illumination of general illumination images may be acquired.

The processing speed and processing performance of a neural network for image enhancement may be in a trade-off relationship. A designer may determine whether to improve the processing speed or the processing performance by changing the initial structure of a neural network.

A designer may set the structure of a neural network according to the image as classified by illumination, and train the corresponding neural network. Accordingly, it is possible to acquire a neural network for image enhancement that may be optimally used according to the image as classified by illumination.

Figure 4:
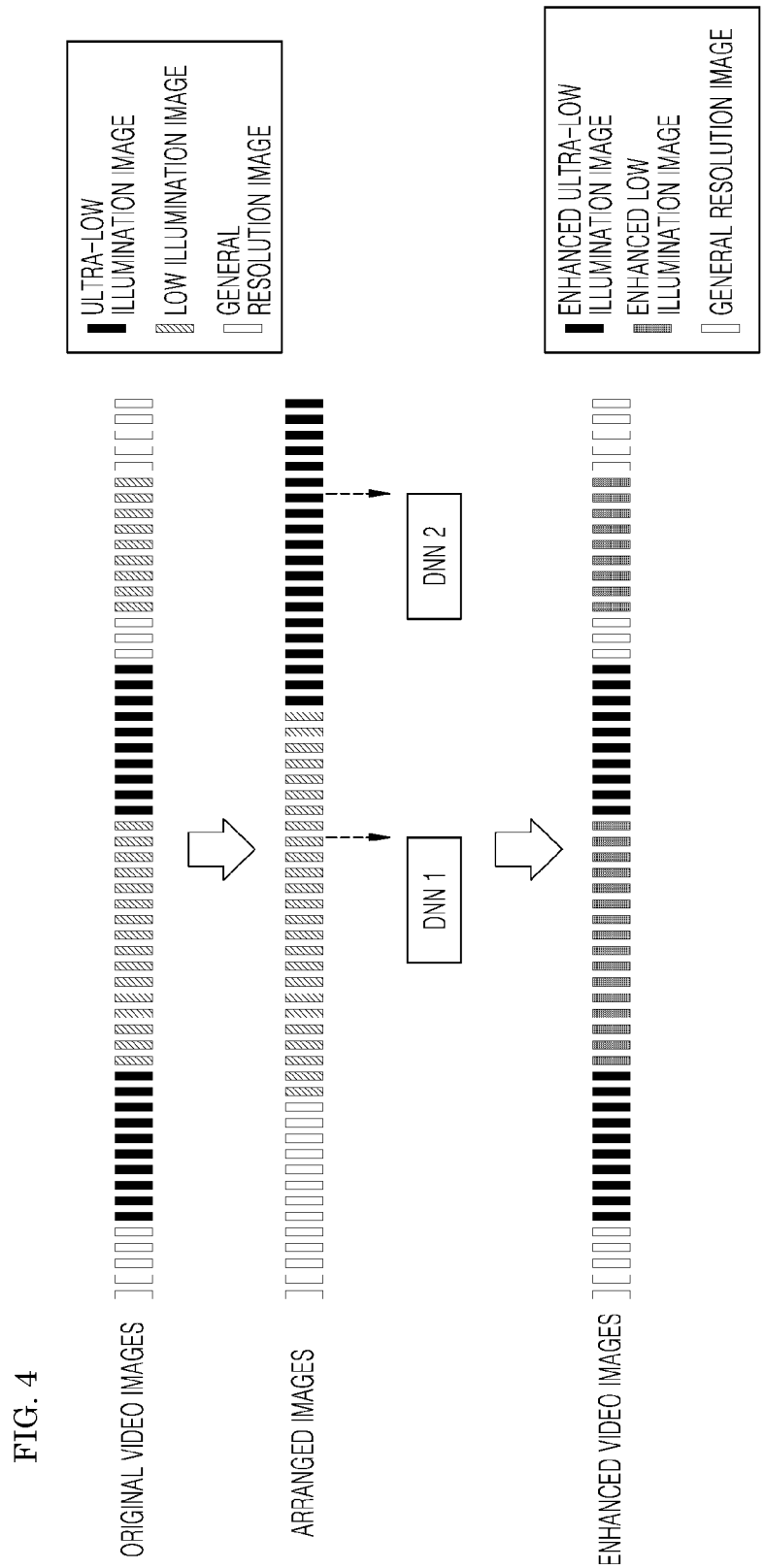
FIG. 4 is a diagram for explaining a video quality improvement method according to an embodiment of the present disclosure.
Figure 5:
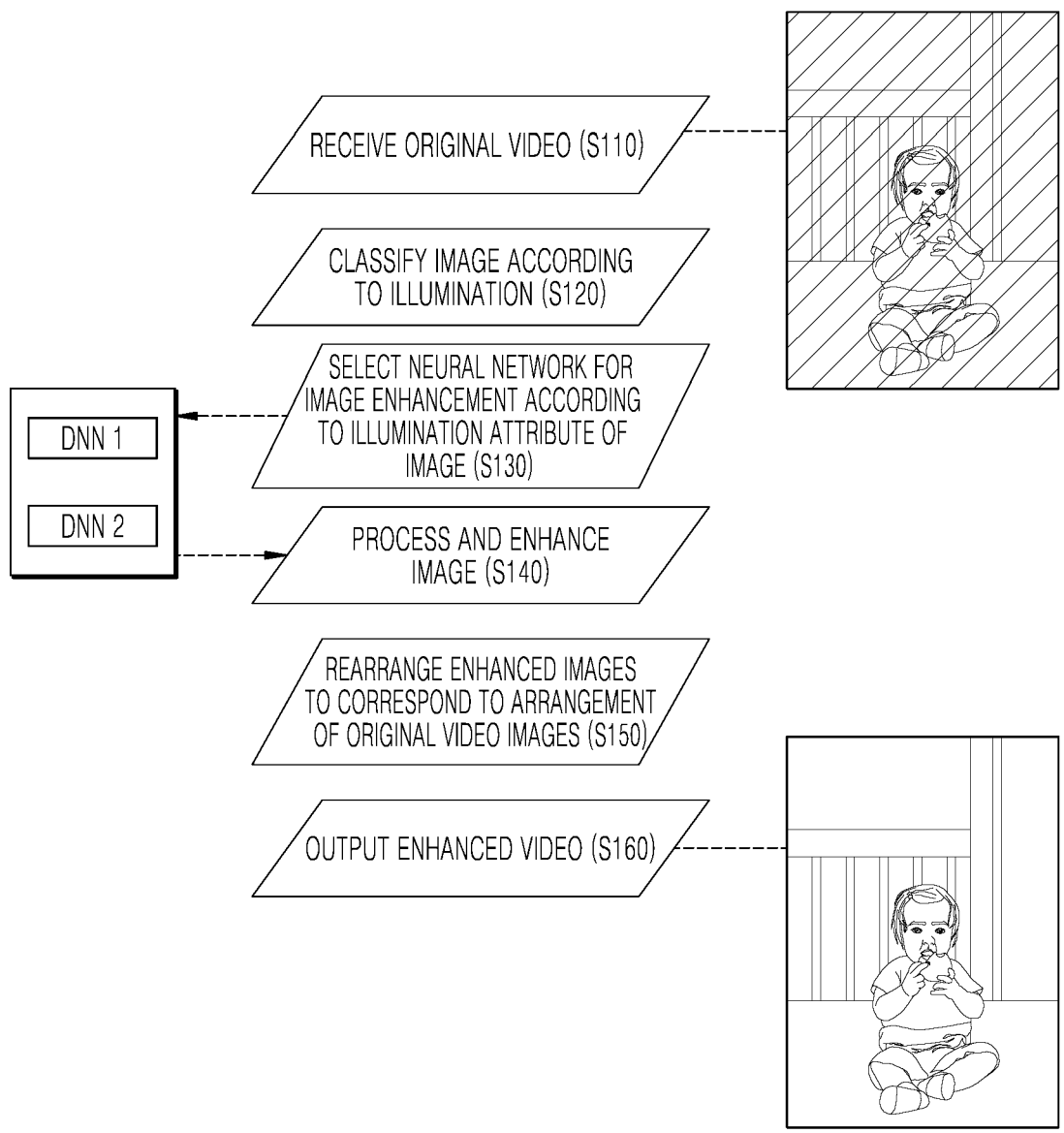
FIG. 5 is a flowchart for explaining a video quality improvement method according to an embodiment of the present disclosure.
Figure 6:
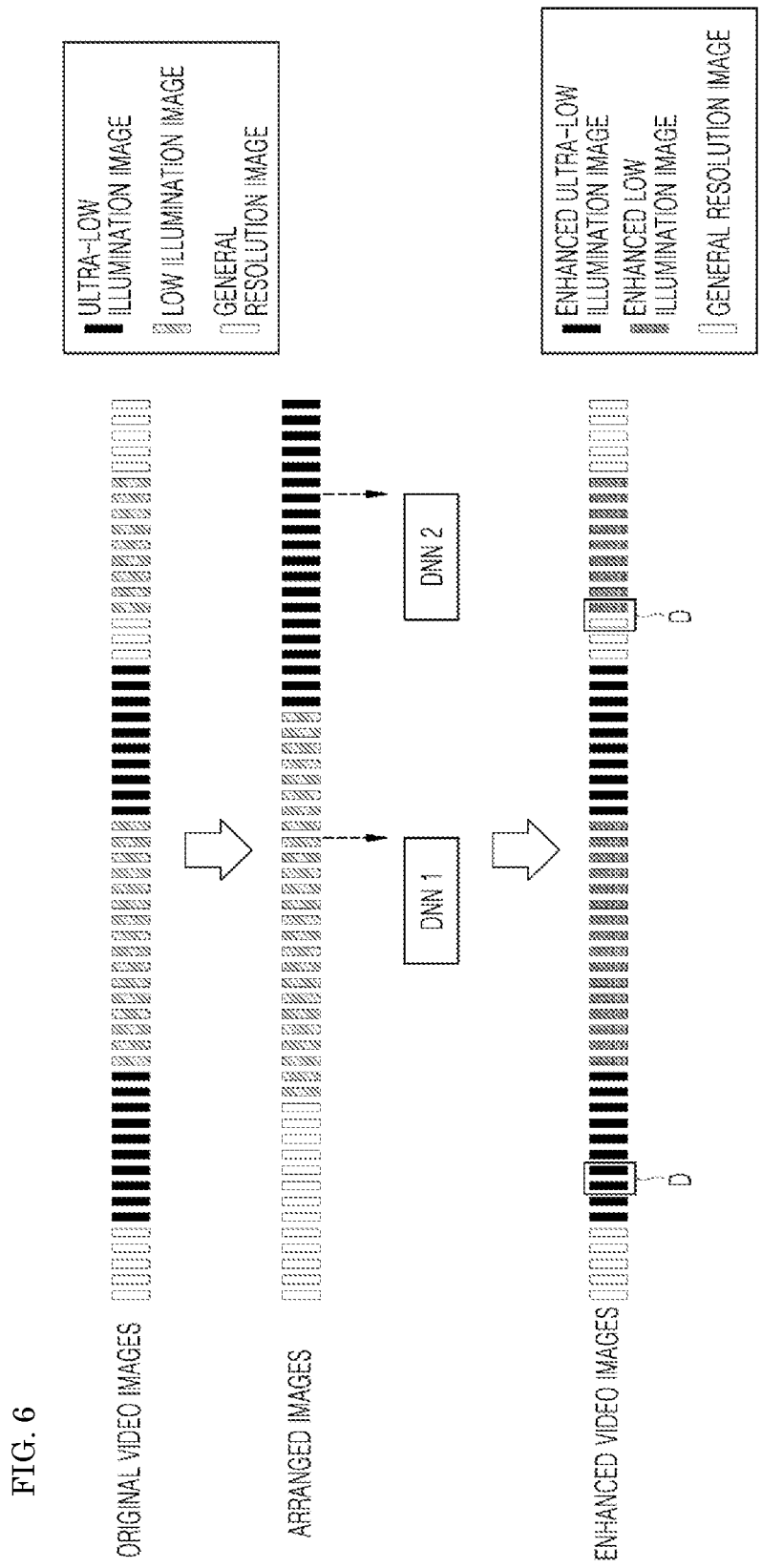
FIG. 6 is a diagram for explaining a method of connecting and reproducing images of different types of illuminations among consecutive images in a video quality improvement method according to an embodiment of the present disclosure.

FIG. 4 is a diagram for explaining a video quality improvement method according to an embodiment of the present disclosure. FIG. 5 is a flowchart for explaining a video quality improvement method according to an embodiment of the present disclosure. FIG. 6 is a diagram for explaining a method of connecting and reproducing images of different illumination among successive images in a video quality improvement method according to an embodiment of the present disclosure.

First, an original video for image enhancement may be received through an apparatus for improving video quality (S110). Here, "original" as used in the "original video" that is received does not refer to video data that is generated first, but is rather used to distinguish video data that is received by a device for quality improvement processing from enhanced video data. Such a video may be captured by an apparatus equipped with a camera, and may be a video stored in user terminal 100. Alternatively, such a video may be a video received through wired or wireless communication from an external device. The image improving apparatus may be a general user terminal such as a computer, a smartphone, and a tablet, or may be a server that performs image illumination improvement in order to receive and improve an image.

The received video may be a multiframe image. In a case where a multiframe image is inputted, when a video is processed in order to improve the illumination thereof, images classified according to the illumination thereof may be inputted to a learning model and used to acquire a high illumination image.

The image proposed as an example in FIGS. 4 and 5 shows a part of a captured video of child, and has a low illumination, such that the image is somewhat blurred and it may be difficult to clearly recognize the state of the child.

The processor of the apparatus for improving video quality may classify the images of the captured video into a first image group and a second image group according to the illumination, in order to enhance the illumination of low illumination images (S120). The first image group refers to ultra-low illumination images among the total frames of the original video, according to a previously inputted illumination condition. The second image group refers to low illumination images among the total frames of the original video, according to a previously inputted illumination condition. In addition, although not shown in the drawings, the images of the video may also include general illumination images in addition to the ultra-low illumination images and the low illumination images, and the general illumination images may be images that can be reproduced without additional enhancement work.

The separated images may be arranged according to their illumination. Specifically, the images of the original video data are arranged by general illumination, low illumination, and ultra-low illumination.

When the images are arranged according to illumination, neural networks for image enhancement may be selected according to the illumination attributes of the arranged images (S130). Specifically, since the ultra-low illumination images of the first image group have the attribute of being lower in illumination than the low illumination images, the illumination thereof may be improved using learning model DNN2, which has a heavy weight. In contrast, since the low illumination images of the second image group have the attribute of having a brightness such that there is no great inconvenience for user viewing, the illumination thereof may be improved using a lightweight learning model DNN1.

More specifically, the processor of the apparatus for improving video quality applies a neural network for low illumination recognition to the images of the original video data so as to recognize low illumination images and ultra-low illumination images among the images classified according to illumination. For example, the processor may use a neural network for low illumination recognition to recognize classified images as low illumination images and ultra-low illumination images. The processor classifies the images into two groups according to the recognized images.

In other words, the processor may identify a feature of the illumination of the image using the neural network for low illumination recognition, and classify the image according to the identified feature of the illumination. For example, according to an embodiment of the present disclosure, the images of the captured video may be classified as either low illumination images or ultra-low illumination images, based on the illumination of the images of the baby girl.

In this exemplary embodiment of the present disclosure, low illumination images and ultra-low illumination images are described as examples of low illumination images that can be classified through a neural network for low illumination recognition, but images having an illumination of less than or equal to a certain illumination value may be classified based on an illumination value within a certain range by classifying the illumination in detail.

Meanwhile, a neural network for image enhancement that improves the illumination of the images of the original video data may be formed using various models, such as a convolutional neural network (CNN), a fully-convolutional neural network (FCNN), a region-based convolutional neural network (R-CNN), and a You Only Look Once (YOLO) network.

In addition, for exemplary purposes, the neural network for image enhancement in this embodiment of the present disclosure is described as classifying and enhancing only low illumination images and ultra-low illumination images, but alternatively, the neural network for image enhancement may enhance the illumination of all images of low illumination images, ultra-low illumination images, and general illumination images.

The general illumination images may be further classified among the frames of the original video data, and the frames classified as general illumination images may not be processed for image enhancement.

After enhancing the illumination of the images classified according to illumination, the images arranged by image groups may be rearranged to correspond to the arrangement of the images of the original video data (S140 and S150).

The enhanced images rearranged to correspond to the arrangement of the images of the original video data may be outputted through the user terminal 100 or stored in the server 200 (S160).

When the enhanced images are rearranged to correspond to the arrangement of the images of the original video data, images having different types of illuminations among the enhanced ultra-low illumination images, the enhanced low illumination images, and the general illumination images may be adjacent to each other.

In particular, as shown in FIG. 6, an enhanced ultra-low illumination image and a general illumination image may be adjacent to each other. In such a case, when outputting an image, inconvenience in viewing the video may be caused due to a difference in illumination between the enhanced ultra-low illumination image and the general illumination image.

For example, it may be assumed that a video having enhanced illumination has an attribute of having a plurality of frames of general illumination images arranged consecutively, followed by a plurality of frames of enhanced ultra-low illumination images arranged consecutively (see regions D of FIG. 6). Here, the difference in illumination between consecutive frames may be a difference of at least two levels of illumination (general illumination image→ultra-low illumination image). As a result, the viewer perceives a difference in illumination in the outputted video.

To minimize this illumination difference, the illumination difference between a first frame, which is one of the frames of the first image group processed by a first neural network, and a second frame, which is adjacent to the first frame and not processed by the first neural network, are measured. Specifically, the first frame is selected from the ultra-low illumination images, and the general illumination image that is adjacent to the first frame is selected as the second frame.

In response to the illumination difference between the selected first frame and the second frame being greater than or equal to a previously stored illumination difference, the illumination difference between the first frame and the second frame is adjusted to be less than or equal to the previously stored illumination difference. For example, a filter having an average value of a filter applied to the processing of the first frame and a filter applied to the processing of the second frame is applied to a first original frame and a second original frame. According to this embodiment, the average value of the filter value of the first frame and the filter value of the second frame may be applied to the first frame and the second frame. As a result, the illumination value of the first frame is increased and the illumination value of the second frame is lowered, thereby reducing the illumination difference of the consecutive frames having different illumination.

Here, the first original frame may be a frame of the original video data corresponding to the first frame, and the second original frame may be a frame of the original video data corresponding to the second frame.

In this embodiment, a case in which a general illumination image and an enhanced ultra-low illumination image are arranged consecutively is described as an example regarding the different types of images for which the illumination difference is reduced. However, in any case in which images having different types of illuminations are arranged consecutively, an average value of the respective frames may be applied to the consecutive images, in the same manner as that described for the present embodiment.

Figure 7:
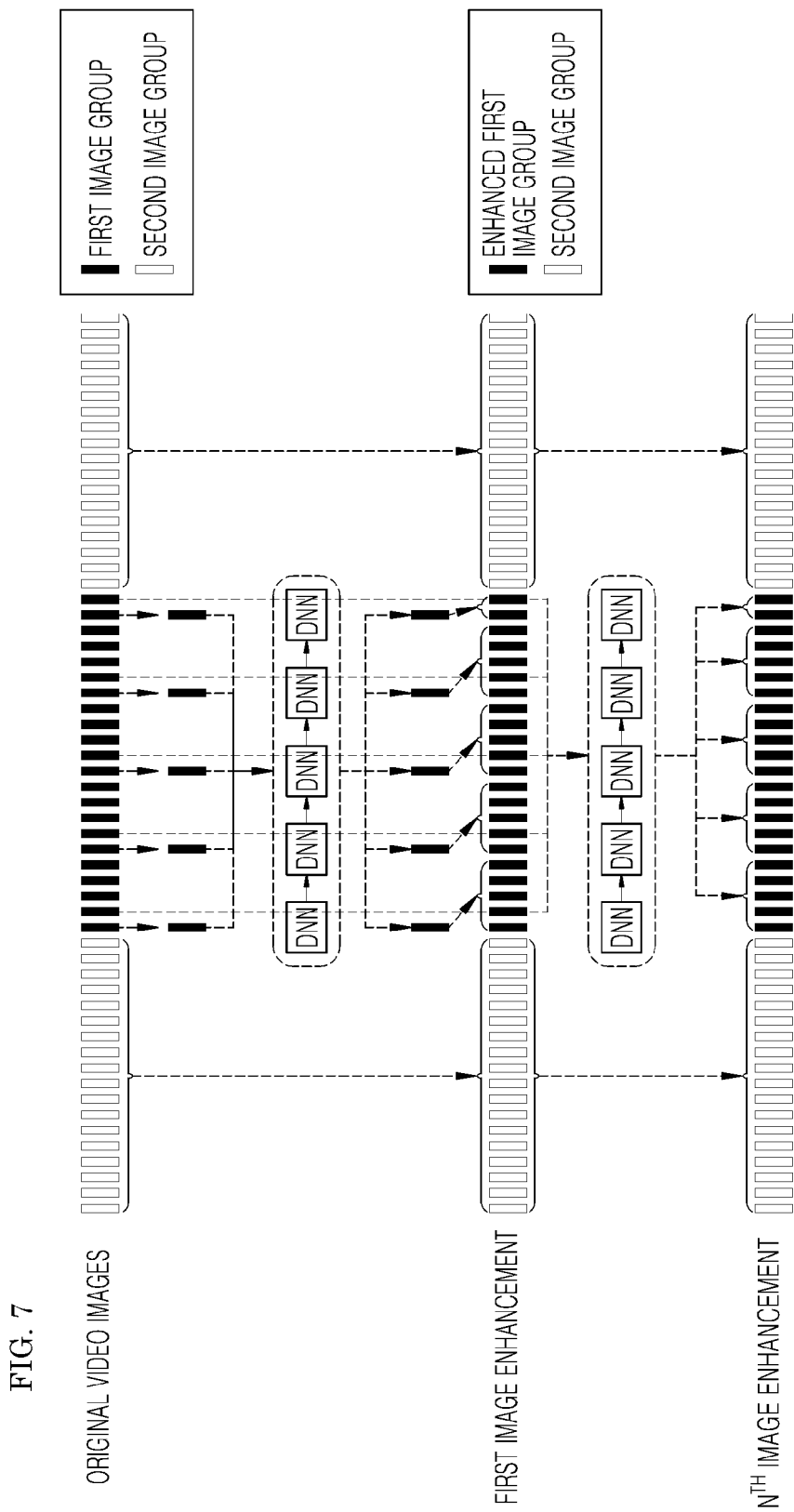
FIG. 7 is a diagram for explaining a process of performing a video quality improvement method in a user terminal according to an embodiment of the present disclosure.
Figure 8:
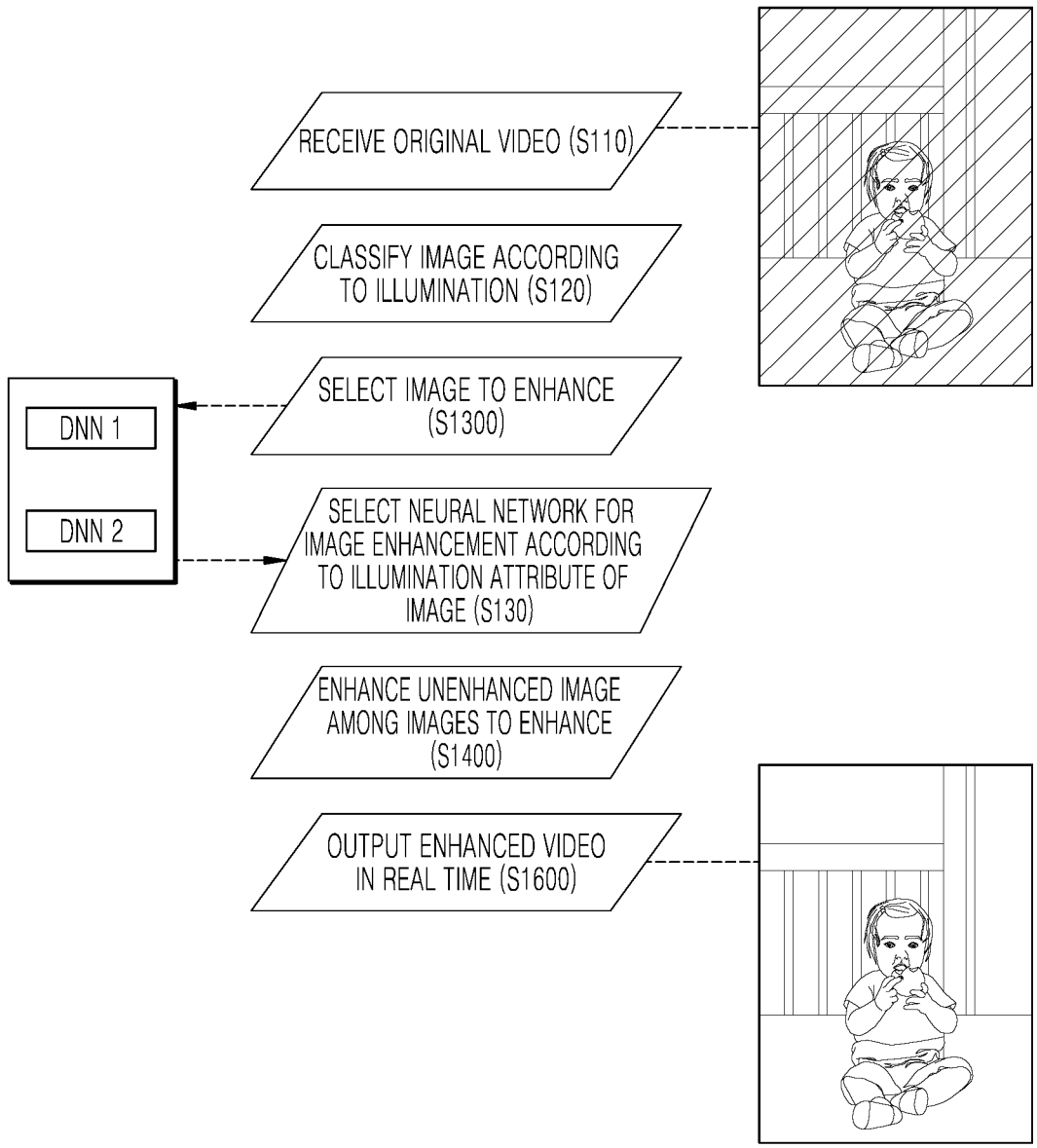
FIG. 8 is a flowchart for explaining a method for reproducing a video having enhanced images in real time, in a video quality improvement method according to an embodiment of the present disclosure.

FIG. 7 is a diagram for explaining a process of performing a video quality improvement method in a user terminal according to an embodiment of the present disclosure. FIG. 8 is a flowchart for explaining a method for reproducing a video having enhanced images in real time, in a video quality improvement method according to an embodiment of the present disclosure.

Referring to FIGS. 7 and 8, original video data frames for image enhancement may be received through an apparatus for improving video quality (S120). Here, the received video may be a video reproduced in real time through an apparatus capable of playing a video. In other words, the image improving apparatus may be a general user terminal such as a computer, a smart phone, and a tablet. The illumination of the video reproduced in real time may be improved through such an image improving apparatus.

To this end, the processor of the apparatus for improving video quality may separate a first image group having an illumination of less than or equal to a previously stored specific illumination value and a second image group having an illumination of greater than or equal to the specific illumination value from the original video data (S120). First images may be low illumination images, and second images may be general illumination (and/or high illumination) images.

When the original video data is separated into low illumination first images and general illumination second images, a section of frames continuously arranged for less than a predetermined time among the frames of the first image group may be configured as one group.

For example, as shown in FIG. 7, it may be assumed that the low illumination first images are reproduced for 30 seconds, and the first images, which are reproduced for 30 seconds, are grouped at intervals of, for example, 5 seconds to form a plurality of groups.

Thereafter, a selection image may be extracted from the first images included in one group (S1300). According to the present embodiment, for example, thirty first images may be reproduced during 30 seconds while being reproduced as the first images. Regarding such a time during which the first images are reproduced, five groups may be formed, in which one group includes five first images, as described above. The image that is reproduced first in each of the groups thus formed may be referred to as a selection image.

The extracted selection image may be processed according to a first neural network for image enhancement, and may be generated as an enhanced frame (S130). Specifically, the processor of the apparatus for improving video quality applies a neural network for low illumination recognition to the images of the original video data so as to separate and recognize low illumination images and general illumination images according to illumination. The processor determines a neural network for image enhancement for image processing based on the images recognized as such. As described above, the training system 300 may generate a neural network group for image enhancement for each image illumination, in which neural networks trained for optimal illumination improvement in processing time and processing performance for each image illumination are included.

As shown in FIG. 7, in an embodiment of the present disclosure, the neural network for first image enhancement may be a learning model that is applied to the selection image, which is the image that is reproduced first in one group.

Here, the neural network for first image enhancement that is applied to the selection image may be selected such that the illumination enhancement processing time is minimized, based on the fact that the original video data is reproduced in real time.

Upon enhancement of the illumination of the selection image by the neural network for first image enhancement, the illumination of the unenhanced first images included in each group may be enhanced (S1400). Here, the unenhanced first images are replaced with the same image as the previously enhanced frame.

The human eye can process 10-12 images per second and recognize the images as separate. In other words, when the human eye is shown frames of about 12 frames per second (FPS) or more, the human eye may recognize the images as a natural video without noticing any flickering. Accordingly, if different images are arranged at intervals of up to about 1/12 seconds, the human eye recognizes the images as a natural video without a flickering phenomenon. Accordingly, when selecting frames continuously arranged for less than a predetermined time among the frames of the first image group, the predetermined time may be, for example, less than 0.08333 seconds.

Based on such fact regarding the human eye, it is assumed that one group and the other group are continuous for less than one second, and in one group, the first image and the unenhanced first images are continuous images for less than one second. Hence, a viewer who views the video may recognize the images as the same image. Accordingly, in one group, the unenhanced first images are replaced with the same image as the enhanced frame so that while the video is playing, the viewer may recognize that he or she is viewing a video as images having enhanced illumination.

After grouping the continuous low illumination first images at the predetermined time intervals, extracting selection images for enhancing illumination, and enhancing illumination for each group, the unenhanced first images included in one group including the first image may be replaced with the same image as the enhanced first image. Since the low illumination images may be enhanced at a high speed by the low illumination image enhancement method as described above, a video having enhanced illumination may be reproduced in real time (S1600).

As mentioned above, by classifying an image according to illumination, arranging the classified images by the illumination, and dynamically selecting and utilizing a neural network for image enhancement optimized for each illumination, embodiments of the present disclosure may achieve the illumination improvement of images efficiently and effectively.

In other words, by classifying and arranging the images forming the video into general illumination images, low illumination images, and ultra-low illumination images according to the illumination attribute of the image, and selecting a neural network for image enhancement suitable for each illumination as classified and arranged, an optimal high illumination image for each illumination may be acquired. As a result, a video viewer may view a video of high illumination.

In addition, a user may further elaborate such learning model by continuously giving feedback on the determination result of the neural network model for image enhancement.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for improving video quality, the method comprising:
   receiving original video data comprising frames;
   classifying the frames into at least a first image group and a second image group according to illumination for image enhancement processing of the original video data, wherein frames of the first image group have lower illumination than frames of the second group;
   selecting a first neural network according to an illumination attribute of the first image group and selecting a second neural network according to an illumination attribute of the second image group, among groups of neural networks for image enhancement; and
   generating enhanced video data by processing the frames of the first image group using the first neural network and processing the frames of the second image group using the second neural network;
   wherein the classifying comprises:
   determining the frames as ultra-low illumination images and low illumination images using a neural network for illumination recognition;
   arranging the frames by the ultra-low illumination images and the low illumination images; and classifying the frames determined as the ultra-low illumination images into the first image group, and classifying the frames determined as the low illumination images into the second image group.

2. The method according to claim 1, wherein the first neural network has a higher complexity than the second neural network.

3. The method according to claim 1, wherein the generating of the enhanced video data comprises rearranging the frames of the first image group processed by the first neural network and the frames of the second image group processed by the second neural network to correspond to the frame arrangement of the original video data.

4. The method according to claim 3, wherein the generating of the enhanced video data comprises:
after the rearranging,
measuring an illumination difference between a first frame, which is one of the frames of the first image group processed by the first neural network, and a second frame, which is adjacent to the first frame and which is not processed by the first neural network; and
in response to the illumination difference between the first frame and the second frame being greater than or equal to a previously stored illumination difference, adjusting the illumination difference between the first frame and the second frame to be less than or equal to the previously stored illumination difference.

5. The method according to claim 4, wherein the adjusting of the illumination difference to be less than or equal to the previously stored illumination difference comprises:
applying, to a first original frame and a second original frame, a filter having an average value of a filter applied to the processing of the first frame and a filter applied to the processing of the second frame,
wherein the first original frame is a frame of the original video data corresponding to the first frame, and the second original frame is a frame of the original video data corresponding to the second frame.

6. The method according to claim 1, wherein the classifying comprises further classifying general illumination images among the frames of the original video data, wherein the frames classified as the general illumination images are not processed for image enhancement.

7. The method according to claim 1, wherein the classifying comprises classifying frames having an illumination of less than a previously stored specific illumination value into a first image group, and classifying frames having an illumination of greater than or equal to the previously stored specific illumination value into a second image group, among the frames of the original video data.

8. The method according to claim 7, wherein the generating of the enhanced video data comprises:
selecting a section of frames continuously arranged for less than a predetermined time, among the frames of the first image group; and
generating an enhanced frame by applying the first neural network to one of the frames in the section.

9. The method according to claim 8, wherein the generating of the enhanced video data comprises:
after the generating of the enhanced frame,
replacing all the frames in the section with the enhanced frame.

10. The method according to claim 8, wherein the frame which is generated as the enhanced frame is the first frame among the frames in the section.

11. A non-transitory computer readable recording medium storing a computer readable program for executing the method of claim 1.

12. The method according to claim 1, further comprising:
training at least one of the first neural network or the second neural network by collecting high illumination frames from among the frames in the original video data having an illumination greater than a predetermined threshold value;
blurring and down-sampling the high illumination frames to generate training frames; and
generating the enhanced video data by processing the frames of the first image group or the frames of the second image group based on the training frames.

13. The method of claim 1, wherein the generating enhanced video data includes adjusting adjacent frames to have an illumination difference that is less than or equal to a predetermined illumination difference.

14. An apparatus for improving video quality, comprising:
a processor; and
a memory connected to the processor,
wherein the memory stores commands configured to, when executed by the processor, cause the processor to:
receive frame images of an original video comprising a plurality of frames;
classify the frame images according to illumination for image enhancement processing of the original video frame images;
separate the frame images into ultra-low resolution images, low resolution images, and general resolution images using neural networks for recognizing a specific illumination, the ultra-low resolution images having lower illumination than the low resolution images and the low resolution images having lower illumination than the general resolution images; and
generate an enhanced image by processing a selected image using a neural network for image enhancement selected from groups of neural networks for image enhancement according to an illumination attribute of at least one of the frame images, selected image being selected from among the ultra-low resolution images, the low resolution images, or the general resolution images.

15. The apparatus according to claim 14, wherein the commands are configured to cause:
arrangement of the frame images by the ultra-low resolution images, the low resolution images, and the general resolution images; and
selection of a neural network for image enhancement to generate enhanced ultra-low resolution images, enhanced low resolution images, and general resolution images.

16. The apparatus according to claim 15, wherein the commands are configured to cause rearrangement of the enhanced ultra-low resolution images, the enhanced low resolution images, and the general resolution images to correspond to the arrangement of the frame images of the original video.

17. The apparatus according to claim 15, wherein when classifying the frame images according to illumination for image enhancement processing of the original video frame images, the commands are configured to cause:
separation of the frame images of the original video into first images having an illumination of less than or equal to a previously stored specific illumination value and second images having an illumination of greater than or equal to the previously stored specific illumination value, among the original video frame images;

extraction of a plurality of selection images from among the first images at predetermined time intervals; and generation of an enhanced first image by processing the extracted selection images according to a neural network for enhancing the first image.

18. The apparatus according to claim 17, wherein:

the selection images comprise a first selection image and a second selection image arranged at predetermined time intervals; and the commands are configured to cause unenhanced first images to be replaced with the same image as the enhanced first image, wherein the unenhanced first images are images that were not extracted as selection images and which are contiguous, adjacent to the first selection image, and arranged between the first selection image and the second selection image.

* * * * *